United States Patent
Biswas et al.

(10) Patent No.: US 10,095,814 B1
(45) Date of Patent: Oct. 9, 2018

(54) USER-CONSTRAINED DELAY REDISTRIBUTION

(71) Applicant: The MathWorks, Inc., Natick, MA (US)

(72) Inventors: Partha Biswas, Wayland, MA (US); Yongfeng Gu, Brookline, MA (US); Zhihong Zhao, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1200 days.

(21) Appl. No.: 14/185,514

(22) Filed: Feb. 20, 2014

Related U.S. Application Data

(60) Provisional application No. 61/770,767, filed on Feb. 28, 2013, provisional application No. 61/770,763, filed on Feb. 28, 2013.

(51) Int. Cl.
    *G06F 17/50*     (2006.01)

(52) U.S. Cl.
    CPC ...... *G06F 17/5009* (2013.01); *G06F 2217/84* (2013.01)

(58) Field of Classification Search
    None
    See application file for complete search history.

(56) References Cited

U.S. PATENT DOCUMENTS

| | | | | |
|---|---|---|---|---|
| 6,041,168 A * | 3/2000 | Hasegawa | .......... | G01R 31/3016 716/108 |
| 7,107,477 B1 * | 9/2006 | Singh | ................. | G06F 17/5054 713/400 |
| 7,296,246 B1 * | 11/2007 | Kuehlmann | ........ | G06F 17/5045 716/108 |
| 8,640,066 B1 * | 1/2014 | Gupta | ................... | G06F 17/505 716/102 |
| 8,977,995 B1 * | 3/2015 | Arora | .................... | G06F 17/505 716/105 |
| 2005/0132316 A1 * | 6/2005 | Suaris | ................. | G06F 17/5031 716/108 |

(Continued)

OTHER PUBLICATIONS

Paik, Seungwhun et al., "Retiming Pulsed Latch Circuits with Regulating Pulse Width", Aug. 2011, IEEE Transactions on Computer-Aided Design of Integrated Circuits and Systems, vol. 30, No. 8, IEEE.*

(Continued)

*Primary Examiner* — Cedric Johnson
(74) *Attorney, Agent, or Firm* — Harrity & Harrity, LLP

(57) ABSTRACT

A device is configured to receive delay information associated with a model including a set of model elements and one or more delay elements. The delay information may identify a model element, of the set of model elements, and a quantity of delay to be associated with the model element. The model may be associated with a total quantity of delay. The device is configured to determine accumulated delay information based on the model, and to determine a set of retiming values associated with the set of model elements. The device is configured to redistribute the one or more delay elements associated with the model, based on the set of retiming values, to satisfy the quantity of delay to be associated with the model element, and to maintain the total quantity of delay associated with the model. The device is configured to provide the redistributed model.

19 Claims, 12 Drawing Sheets

(56) References Cited

U.S. PATENT DOCUMENTS

2008/0276212 A1* 11/2008 Albrecht ............... G06F 17/505
716/122

OTHER PUBLICATIONS

Leiserson, Charles E. et al., "Retiming Synchronous Circuitry", 1991, Algorithmica, Springer-Verlag.*
Kostekijk, A.P. et al., "Functional Verification for Retiming and Rebuffering Optimization" 1993, IEEE.*
Wikipedia, "Retiming", http://en.wikipedia.org/wiki/Retiming, Mar. 16, 2013, 3 pages.

* cited by examiner

USER-CONSTRAINED DELAY REDISTRIBUTION

This application is a non-provisional application claiming priority to U.S. Provisional Patent Application Nos. 61/770,767 and 61/770,763, filed Feb. 28, 2013, the entire contents of which are incorporated herein in their entirety.

DETAILED DESCRIPTION

The following detailed description of example implementations refers to the accompanying drawings. The same reference numbers in different drawings may identify the same or similar elements.

A client device, such as a computer, may receive a model of a system to be implemented on a target platform (e.g., digital hardware). The model may be associated with an operating frequency (e.g., a clock rate), which may depend on a critical path associated with the model. The critical path may include a longest path between two delay elements of the model. To increase the operating frequency, the client device may reconfigure the model to shorten the critical path (e.g., via distributed pipelining). In some instances, reconfiguring the model may require additional delay to be associated with one or more model elements (e.g., based on the distributed pipelining). In some instances, the client device may automatically reconfigure the model to shorten the critical path, and may automatically determine a location and/or a quantity of delay to be placed in the model.

However, a user of the model may desire to apply a constraint to the model (e.g., a specified quantity of delay to be associated with a particular location of the model) such that the client device satisfies the constraint while automatically reconfiguring the model (e.g., to reduce the length of the critical path). For example, the user may desire to specify a quantity and/or location of delay to be associated with the model to permit an additional model element (e.g., an adder), which may incur an additional amount of delay (e.g., additional cycles), to be included in the model. In some instances, the user may desire to specify the quantity and/or location of the delay without altering the overall functionality of the model. Implementations described herein may allow a client device to satisfy a user-constrained delay requirement by redistributing delay associated with the model so that the overall functionality of the model remains unchanged.

Figure 1:
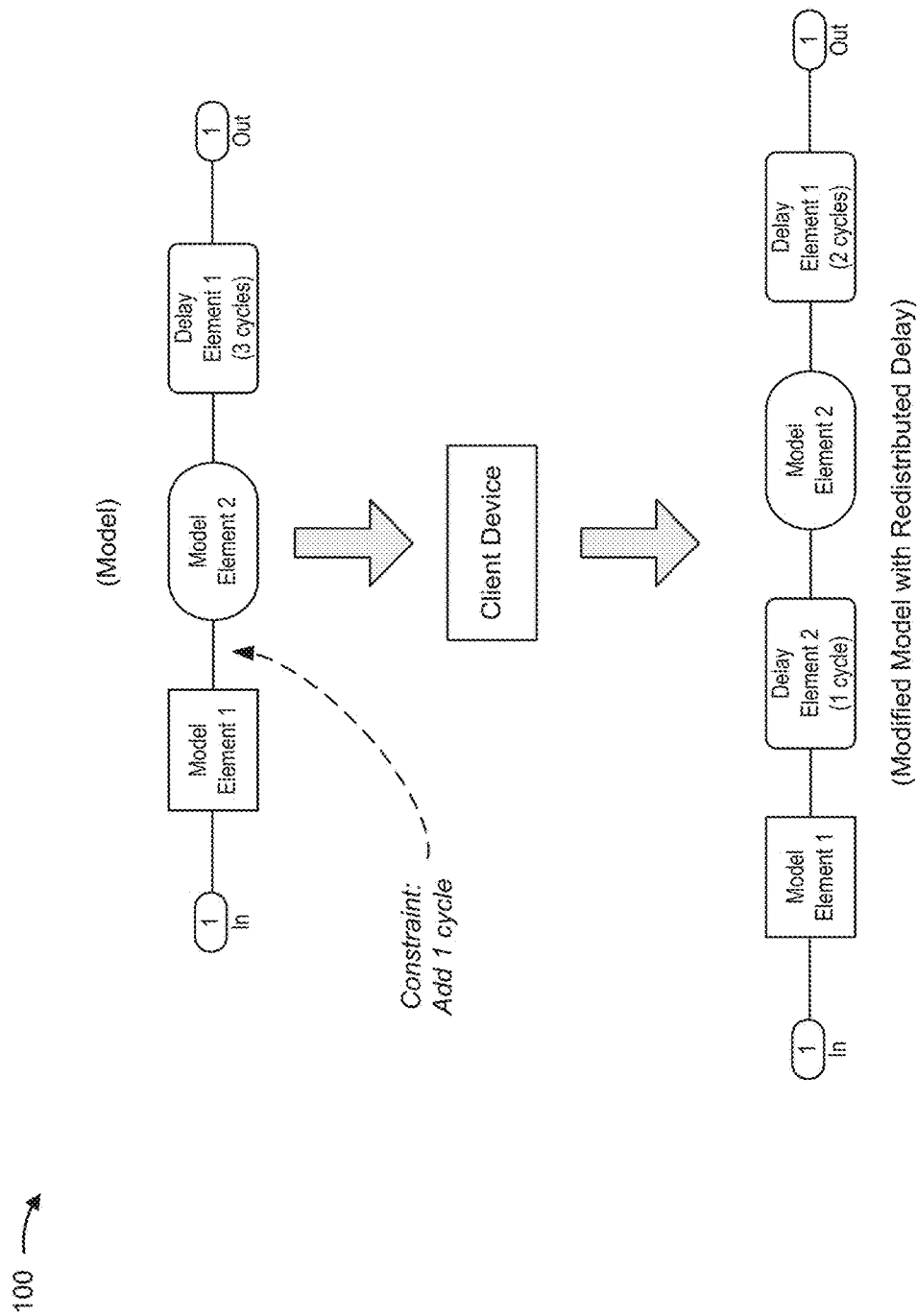
FIG. 1 is a diagram of an overview of an example implementation described herein.

FIG. 1 is a diagram of an overview of an example implementation 100 described herein. As shown in FIG. 1, a client device may receive a model. The model may include a first model element (e.g., "Model Element 1"), a second model element (e.g., "Model Element 2") and a first delay element (e.g., "Delay Element 1") associated with a quantity of delay (e.g., 3 cycles). The client device may receive delay information that identifies a constraint to be applied to the model. The constraint may be determined based on user input (e.g., from a user of the client device), and may identify that a quantity of delay (e.g., 1 cycle) is to be associated with the output of the first model element.

As further shown in FIG. 1, the client device may redistribute delay associated with the model to satisfy the constraint while keeping the overall delay associated with the model the same (e.g., 3 cycles). The client device may add a second delay element (e.g., "Delay Element 2") between the first model element and the second model element. The client device may reduce the quantity of delay associated with the first delay element (e.g., 3 cycles) by a quantity of delay (e.g., 1 cycle), and may add the quantity of delay to the second delay element so as to satisfy the constraint (e.g., 1 cycle). In this manner, with the quantity of delay associated with the first delay element reduced (e.g., by 1 cycle) and a quantity of delay increased at the output of the first model element (e.g., by 1 cycle), the client device may redistribute delay associated with the model so as to satisfy the constraint while maintaining the overall delay of the model.

Figure 2:
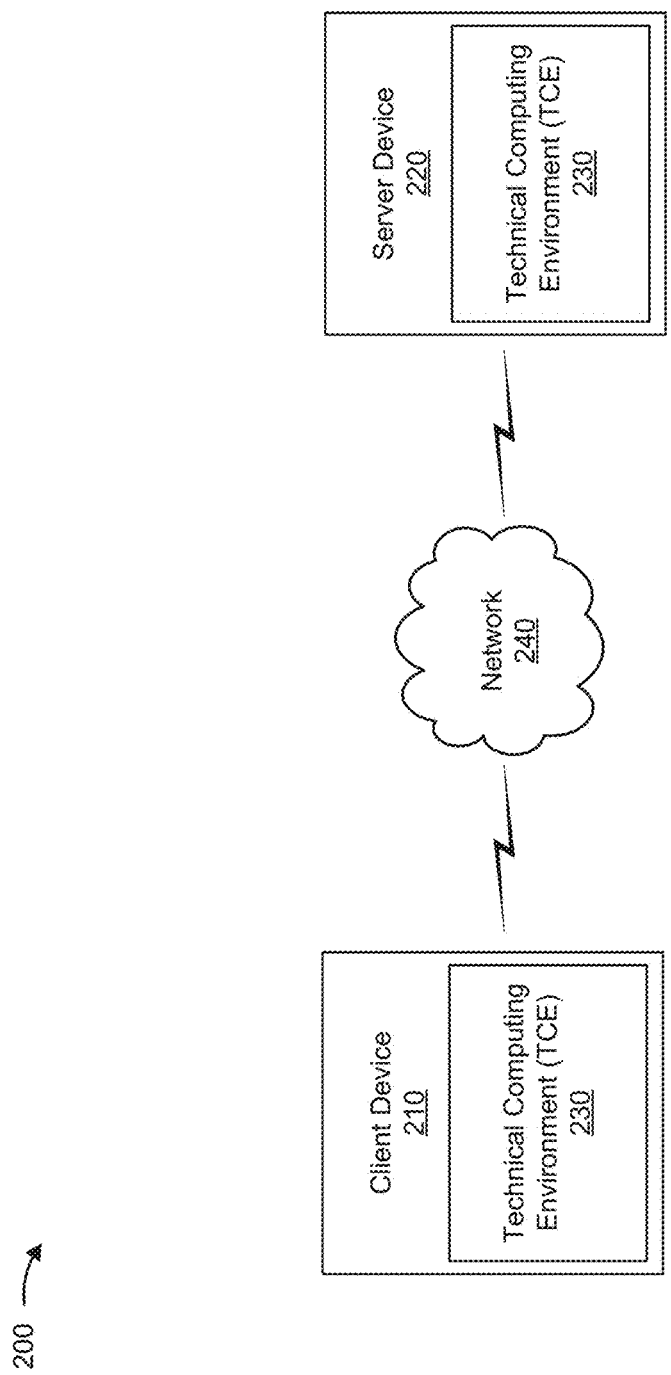
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 210, server device 220, a technical computing environment ("TCE") 230, and a network 240. Devices of environment 200 may interconnect via wired connections, wireless connections, or a combination of wired and wireless connections.

Client device 210 may include a device capable of receiving, generating, storing, processing, executing, and/or providing program information, such as information associated with a model. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or provide information to server device 230.

Server device 220 may include one or more devices capable of receiving, generating, storing, processing, executing, and/or providing information, such as information associated with a model. For example, server device 220 may include a computing device, such as a server, a desktop computer, a laptop computer, a tablet computer, a handheld computer, or a similar device. Server device 220 may receive information from and/or provide information to client device 210.

Client device 210 and/or server device 220 may host TCE 230. TCE 230 may include any hardware-based logic or a combination of hardware and software-based logic that provides a computing environment that allows tasks to be performed (e.g., by users) related to disciplines, such as, but not limited to, mathematics, science, engineering, medicine, and business. TCE 230 may include a text-based environment (e.g., MATLAB® software), a graphically-based environment (e.g., Simulink® software, Stateflow® software, SimEvents® software, etc., by The MathWorks. Inc.; Vis-Sim by Visual Solutions; LabView by National Instruments; Agilent VEE by Agilent Technologies; Advanced Design System ("ADS") by Agilent Technologies; Agilent Ptolemy by Agilent Technologies; etc.), or another type of environment, such as a hybrid environment that may include, for example, a text-based environment and a graphically-based environment.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
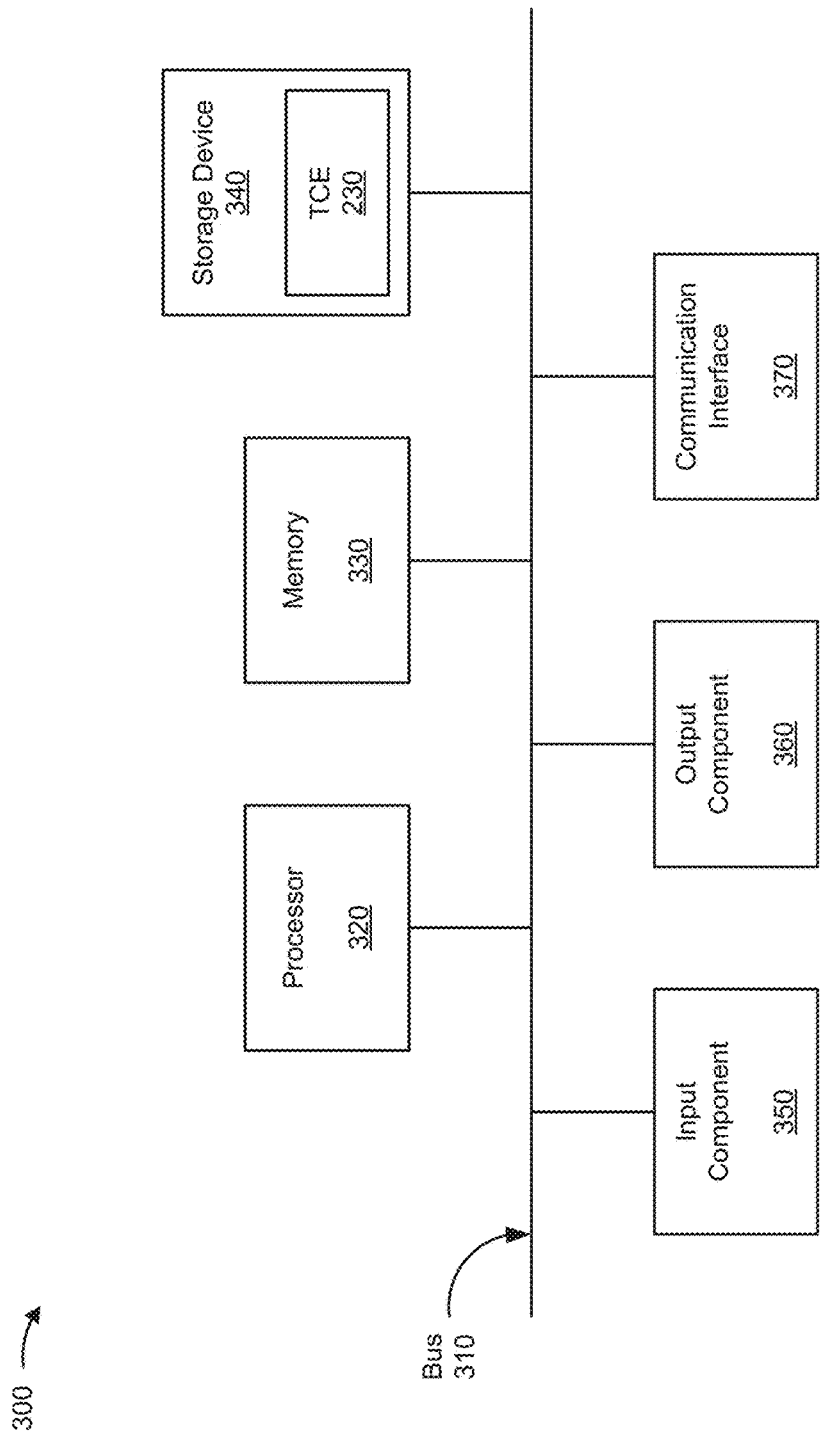
FIG. 3 is a diagram of example components of one or more devices of FIG. 2.

FIG. 3 is a diagram of example components of a device 300. Device 300 may correspond to client device 210 and/or server device 220. Additionally, or alternatively, each of client device 210 and/or server device 220 may include one or more devices 300 and/or one or more components of device 300. As shown in FIG. 3, device 300 may include a bus 310, a processor 320, a memory 330, a storage device 340, an input component 350, an output component 360, and a communication interface 370.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Storage device 340 may store information and/or software related to the operation and use of device 300. For example, storage device 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage device 340 may store TCE 230.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes ("LEDs"), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330 and/or storage device 340. A computer-readable medium may be defined as a non-transitory memory device. A memory device may include memory space within a single physical storage device or memory space spread across multiple physical storage devices.

Software instructions may be read into memory 330 and/or storage device 340 from another computer-readable medium or from another device via communication interface 370. When executed, software instructions stored in memory 330 and/or storage device 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4A:
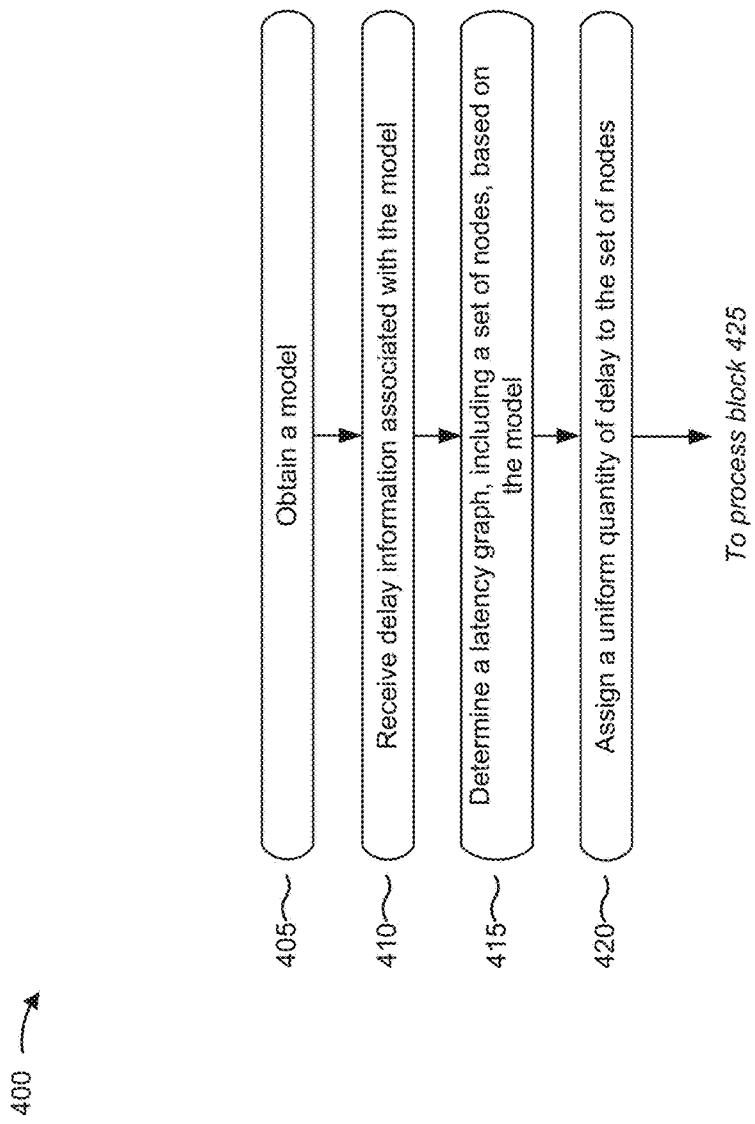
FIGS. 4A and 4B are a flow chart of an example process for redistributing delay in a model based on a constraint.
Figure 4B:
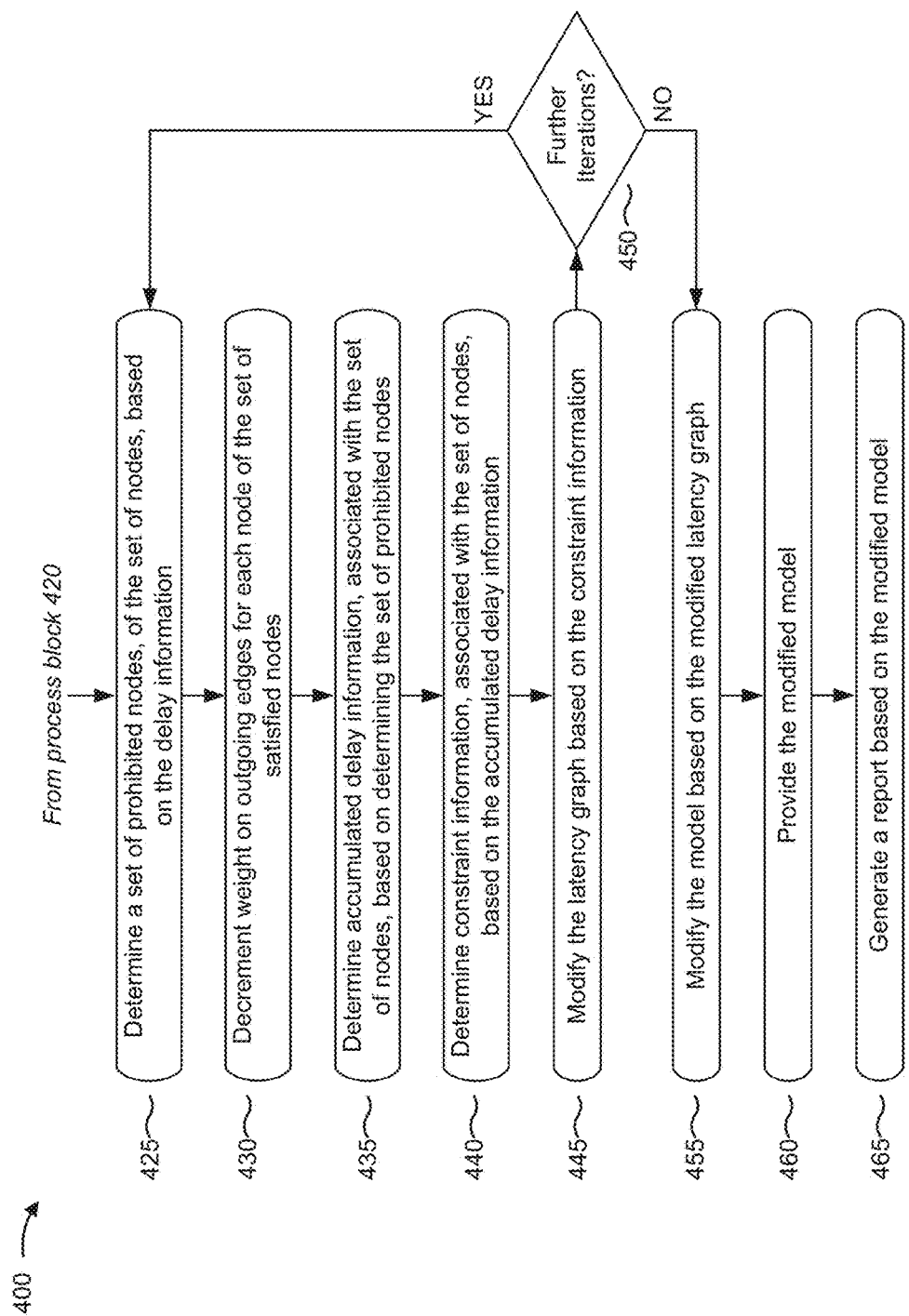

FIGS. 4A-4B are a flow chart of an example process 400 for redistributing delay in a model based on a constraint. In some implementations, one or more process blocks of FIGS. 4A-4B may be performed by client device 210. Additionally, or alternatively, one or more process blocks of FIGS. 4A-4B may be performed by another device or a group of devices separate from or including client device 210, such as server device 220.

As shown in FIG. 4, process 400 may include obtaining a model (block 405). For example, client device 210 (e.g., TCE 230) may receive a request, from a user of client device 210, to access a model. The request may include information identifying the model, such as a name of the model, and information identifying a memory location at which the model is stored. The memory location may be located within client device 210 or external to, and possibly remote from, client device 210 (e.g., such as server device 220). Client device 210 may, based on receiving the request, retrieve the model from the memory location. In some implementations, client device 210 may provide, for display, a user interface that depicts all or a portion of the model.

In some implementations, the model may include a set of model elements that, when executed on a computing device, simulates behavior of a system, such as a dynamic system (e.g., an airplane wing/aileron system); a natural system (e.g., human organ, a plant, etc.), a physical system (e.g., a bouncing ball, etc.), etc. The system may include a set of physical elements that correspond to portions and/or components of the system. The model elements may correspond to physical elements and may, when executed, simulate the behavior of the physical elements and/or the system. The description below is described in the context of a dynamic system for explanatory purposes only. Systems and/or methods, described herein, may also be applied to static systems.

In some implementations, the model may include a block diagram model. The block diagram model may include one or more blocks (e.g., model elements) that represent an operation of a component of the system (e.g., adding, subtracting, multiplying, etc.). The blocks may be connected via one or more signal lines (e.g., lines for carrying a signal associated with the blocks). In some implementations, a block may represent a dynamic system, such as a difference equation, an algebraic equation, a state transition behavior, or the like. A parameter may describe the behavior of a block in the context of the block diagram model, and may influence a manner in which the block behaves, when executed. For example, the parameter may identify an input to the block (and/or a system represented by the block), an output from the block, a manner in which the input is processed by the block, a manner in which the output is generated by the block, a state associated with the block, and/or other information that describes a behavior of the block. A user may interact with a custom user interface to specify a value of a parameter (e.g., a numerical value, a string value, a Boolean value, an array of values, etc.).

In some implementations, the block may be associated with a block sample time. The block sample time may include a parameter that indicates when, during simulation, the block produces an output and/or updates an internal state associated with the block. In some implementations, the model may be associated with a model sample time. The model sample time may include a rate at which the system samples an input. For example, client device 210 may model a single rate system, a multi-rate system, a hybrid continuous-discrete system, etc. by setting block sample times that control a rate of block execution. In some implementations, the model sample time may differ from a target clock speed associated with a target platform (e.g., on which the model is to be implemented).

In some implementations, a block may infer (e.g., inherit) a sample time associated with another block, a data type (e.g., a fixed point data type, a floating point data type, a custom data type, etc.) associated with another block, or the like, based on internal rules associated with the model. For example, a data type and sample time may be defined for an input into the model (or a part of the model), and the blocks associated with the model (or the part of the model) may inherit the data type and sample time, associated with the input, based on the internal rules.

In some implementations, the sample time (e.g., associated with a block) may be associated with a quantity of delay. The quantity of delay may correspond to a quantity of cycles (e.g., clock cycles) associated with a target platform, and thus may correspond to a quantity of cycles associated with target hardware. In this manner, the delay associated with the sample time may correspond to a quantity of cycles associated with the target platform.

As further shown in FIG. 4A, process 400 may include receiving delay information associated with the model (block 410). For example, client device 210 may receive the delay information from server device 220. Additionally, or alternatively, client device 210 may receive the delay information from a user of client device 210 (e.g., via user input).

In some implementations, the delay information may include information that identifies a constraint to be applied to the model. The constraint may identify a quantity of delay to be associated with a portion of the model. The delay may be expressed as a quantity of cycles (e.g., clock cycles), a quantity of seconds (e.g., nanoseconds), or the like. For example, the delay information may identify a quantity of cycles to be associated with a model element (e.g., to be associated with the output of the model element).

In some implementations, client device 210 may determine the constraint based on optimizing the model. For example, client device 210 may reconfigure the model, via distributed pipelining, to increase an operating frequency of the model (e.g., by reducing a critical path associated with the model). Based on reconfiguring the model, client device 210 may identify regions of the model (e.g., particular model elements) where additional quantities of delay may be needed to permit the reconfiguration.

In some implementations, client device 210 may determine the constraint based on user input. For example, client device 210 may receive user input from a user of client device 210 (e.g., via a user interface associated with client device 210). The user input may identify a constraint (e.g., an amount of delay to be inserted at a particular location in the model, such as associated with a particular signal line, following a particular model element, etc.).

In some implementations, the user may provide the user input via a user interface (e.g., associated with client device 210). For example, the user may provide the constraint via a dialog box (e.g., an application window for receiving the user input). In some implementations, the user input may include one or more characters (e.g., letters, numbers, symbols, etc.) that identify the constraint (e.g., that identify the amount of delay to be inserted at the particular location in the model). Additionally, or alternatively, the user input may include a script (e.g., a program), a formula, an equation, or the like, and client device 210 may determine the constraint based on the script, the formula, the equation, etc.

In some implementations, the constraint may include a value (e.g., an integer value), a quantity of cycles, or the like, to be inserted into the model. Additionally, or alternatively, the user input may identify a portion of time to be inserted into the model. The portion of time may include a portion of logical time, a portion of physical time, a portion of simulation time (e.g., time associated with simulating the model), a portion of target time (e.g., time associated with a target platform), or the like.

In some implementations, the user input may identify a constraint at a block-level (e.g., an amount of delay to be associated with a particular block), a port level (e.g., an amount of delay to be associated with a particular port), a signal-level (e.g., an amount of delay to be associated with a particular signal), or the like.

In some implementations, client device 210 may determine the constraint based on an internal requirement (e.g., a requirement associated with an optimization, a requirement associated with implementing the model on a target platform, etc.). For example, client device 210 may determine the constraint based on determining that a particular model element (e.g., an adder) associated with a particular quantity of delay (e.g., 11 cycles) is to be added to the model. Additionally, or alternatively, client device 210 may determine the constraint based on determining that the model is to be implemented on a target platform (e.g., a field-programmable gate array ("FGPA"), an application-specific integrated circuit ("ASIC"), etc.). For example, client device 210 may determine the constraint based on determining that the model is to be pipelined for implementation on the target platform (e.g., based on distributed pipelining).

In some implementations, client device 210 may determine the constraint based on a rate transition block. For example, the model may be associated with a first sample rate and a second sample rate. Client device 210 may automatically insert a rate transition block based on an execution mode associated with the model (e.g., a multitasking mode). The rate transition block may transfer data from an output of a first block associated with the first sample rate to an input of a second block associated with the second sample rate. Client device 210 may determine the constraint based on a quantity of delay required by the rate transition block (e.g., client device 210 may determine to redistribute delay associated with the model to a location where the rate transition block is inserted).

As further shown in FIG. 4, process 400 may include determining a latency graph, including a set of nodes, based on the model (block 415). For example, client device 210 may determine a latency graph based on a set of model elements associated with the model. In some implementations, the latency graph may include a directed graph that represents latency associated with a set of model elements. Latency may include a measure of the time delay experienced in the model (e.g., a quantity of delay associated with one or more model elements). In some implementations, the latency graph may include a set of nodes. The set of nodes may include two or more nodes connected by one or more edges (e.g., directed edges). In some implementations, a node may correspond to a single model element of the model. In some implementations, a node may correspond to more than one model element (e.g., a meta-node). For example, the model may include a set of model elements representing a loop (e.g., an algebraic loop, a feedback loop, etc.). Client device 210 may determine a meta-node that represents the set of model elements associated with the loop, and may include the meta-node in the latency graph.

In some implementations, the latency graph may include an external node. The external node may represent an input and/or an output to the set of model elements (e.g., the set of model elements represented by the latency graph).

In some implementations, an edge may correspond to a path between two nodes. In some implementations, an edge may be associated with a weight. A weight may correspond to a quantity of delay (e.g., a quantity of cycles, a quantity of seconds, a quantity of registers, etc.) between two nodes (e.g., between two model elements). For example, the model may include a first node (e.g., corresponding to a first model element) and a second node (e.g., corresponding to a second model element). Client device 210 may determine a quantity of delay associated with an edge (e.g., a signal line) between the first node and the second node (e.g., corresponding to a first register and a second register associated with a signal line between the first model element and the second model element). Client device 210 may represent the quantity of delay, in the latency graph, as a weight between the first node and the second node (e.g., corresponding to a total of a quantity of delay associated with the first register plus a quantity of delay associated with the second register).

In some implementations, client device 210 may determine the latency graph based on the model. For example, a model may include a first model element (e.g., an adder) and a second model element (e.g., a multiplier) arranged in a circuit. The model may include a quantity of delay (e.g., 3 cycles) between the output of the first model element and the input of the second model element, and a quantity of delay (e.g., 2 cycles) between the output of the second model element and the output of the circuit (e.g., the model may include a first delay element between the adder and the multiplier and a second delay element between the multiplier and the output of the circuit). Client device 210 may determine a latency graph associated with the model. The latency graph may include a first node (e.g., corresponding to the adder), a second node (e.g., corresponding to the multiplier), and an external node (e.g., representing an input and/or output of the circuit). The latency graph may display a first weight (e.g., 3 cycles) associated with an amount of delay between the first node and the second node (e.g., corresponding to the first delay element) and a second weight (e.g., 2 cycles) between the second node and the external node (e.g., corresponding to the second delay element). In this manner, client device 210 may represent a set of model elements and a quantity of delay associated with the set of model elements.

As further shown in FIG. 4A, process 400 may include assigning a uniform quantity of delay to the set of nodes (block 420). For example, client device 210 may assign a single unit of delay (e.g., a cycle) to each node of the set of nodes. In some implementations, the single unit of delay may differ from an actual delay associated with a model element corresponding to the node (e.g., the node assigned the single unit of delay). For example, a model element (e.g., corresponding to an adder) may be associated with a particular quantity of delay (e.g., 3 cycles). Client device 210 may represent the model element as a node in the latency graph, and may assign the node a single unit of delay (e.g., 1 cycle) that differs from the particular quantity of delay (e.g., 3 cycles) of the model element. In some implementations, a different quantity of delay (e.g., other than a single unit of delay) may be uniformly assigned to the set of nodes.

As shown in FIG. 4B, process 400 may include determining a set of satisfied nodes, of the set of nodes, based on the delay information (block 425). For example, client device 210 may determine the set of satisfied nodes based on determining which nodes, of the set of nodes, satisfy a constraint (e.g., are associated with a quantity of delay identified by the delay information). Based on determining the set of satisfied nodes, client device 210 may be able to redistribute delay associated with the model without affecting the delay associated with the satisfied nodes.

In some implementations, a satisfied node may include a node, in the latency graph, associated with a quantity of delay that satisfies a constraint identified by the delay information (e.g., that satisfies a quantity of delay requested by a user). For example, the delay information may identify a constraint associated with a node (e.g., that there is to be 1 unit of delay at an output of a model element corresponding to the node). Client device 210 may determine, based on the latency graph, that an edge directed out of the node is already associated with a weight (e.g., corresponding to 1 unit of delay). Based on determining that the weight directed out of the node (e.g., 1 unit of delay) matches the constraint on the output of the model element (e.g., 1 unit of delay), client device 210 may determine that the node is a satisfied node.

In some implementations, the satisfied node may include a node for which the constraint is exactly satisfied. For example, a constraint may indicate that there is to be 2 units of delay at an output of a model element corresponding to a node in the latency graph. Client device 210 may determine that there are already 4 units of delay associated with an edge directed out of the node. Based on determining that the constraint is not exactly satisfied (e.g., that there is a weight of 4 units of delay instead of a weight of 2 units of delay associated with the edge directed out of the node), client device 210 may determine that the node is not a satisfied node.

In some implementations, the set of satisfied nodes may include one or more nodes for which constraints are satisfied. For example, client device 210 may determine that the latency graph includes a first edge (e.g., directed out of a first node) associated with a first weight (e.g., 2 units of delay), and a second edge (e.g., directed out of a second node) associated with a second weight (e.g., 1 units of delay). Based on determining that the first weight matches a first constraint (e.g., 2 units of delay), and that the second weight matches a second constraint (e.g., 1 unit of delay), client device 210 may determine that the set of satisfied nodes includes the first node and the second node.

In some implementations, the set of satisfied nodes may be empty (e.g., a null set). For example, client device 210 may determine that none of the nodes, in the latency graph, are associated with weights that satisfy constraints identified in the delay information (e.g., due to the nodes being associated with constraints that are not satisfied, due to the nodes being associated with no constraint, etc.).

As further shown in FIG. 4B, process 400 may include decrementing weight on outgoing edges for each node of the set of satisfied nodes (block 430). For example, client device 210 may decrement (e.g., remove) a weight associated with an edge directed out of a satisfied node (e.g., so as to ensure that the weight will not be redistributed within the latency graph). For example, client device 210 may determine that a node, associated with a weight (e.g., 1 unit of delay) on an edge directed out of the node (e.g., corresponding to 1 unit of delay at the output of a model element corresponding to the node), is a satisfied node. Based on determining that the node is a satisfied node, client device 210 may remove the weight (e.g., 1 unit of delay) from the latency graph so as to prevent the weight from being redistributed to another edge of the latency graph.

As further shown in FIG. 4B, process 400 may include determining accumulated delay information, associated with the set of nodes, based on determining the set of satisfied nodes (block 435). For example, client device 210 may determine the set of satisfied nodes, and may determine the accumulated delay information associated with the latency graph.

In some implementations, the accumulated delay information may include information that identifies a quantity of accumulated delay associated with one or more nodes on a path between delay elements (e.g., between two registers). The accumulated delay may include a delay assigned to a node (e.g., a uniform delay) plus the delays assigned to other nodes that precede the node in the path between the delay elements. For example, the latency graph may include a set of nodes, including a first node (e.g., an external node representing an input to the latency graph), a second node, and a third node. The set of nodes may be associated with a path between two delay elements (e.g., a first register and a second register). Each of the nodes, of the set of nodes, may be assigned a uniform unit of delay (e.g., 1 unit). Client device 210 may start with an external node (e.g., the first node) and may determine a first accumulated delay associated with the first node (e.g., one unit of delay). Client device 210 may determine a second accumulated delay associated with the second node (e.g., two units of delay), corresponding to the uniform delay of the first node (e.g., 1 unit) plus the uniform delay of the second node (e.g., 1 unit). Client device 210 may determine a third accumulated delay associated with the third node (e.g., three units of delay), corresponding to the uniform delay of the first node (e.g., 1 unit) plus the uniform delay of the second node (e.g., 1 unit) plus the uniform delay of the third node (e.g., 1 unit).

As further shown in FIG. 4B, process 400 may include determining constraint information, associated with the set of nodes, based on the accumulated delay information (block 440). For example, client device 210 may identify a constrained node of the set of nodes. A constrained node may include a node for which client device 210 is to redistribute one or more weights. In some implementations, client device 210 may identify a first constrained node, of a set of constrained nodes, based on a location of the constrained node in the latency graph (e.g., based on the constrained node being a first in a series of nodes to be constrained).

In some implementations, client device 210 may determine a constraint value associated with the constrained node. The constraint value may include the accumulated delay of the constrained node. For example, a constrained node may be associated with a particular accumulated delay (e.g., 2), and may have a matching constraint value (e.g., 2).

In some implementations, client device 210 may determine a set of retiming values, associated with the set of nodes, based on the constraint information (e.g., based on the constraint value associated with the constrained node). A retiming value may include a value used for redistributing weights associated with the latency graph (e.g., an integer lag value).

In some implementations, client device 210 may determine the retiming value of a node based on the accumulated delay information. For example, client device 210 may determine the retiming value of a node based on the following relationship:

if $r(n)$=accumulated delay $(n)$>constraint value, then 1; else 0, where $r(n)$ is the retiming value of a node, accumulated delay (n) is the accumulated delay of the node, and constraint value is the accumulated delay of the constrained node. Thus, client device 210 may set the retiming value to 1 for nodes associated with accumulated delays that are greater than the constraint value, and may set the retiming value to 0 for nodes associated with accumulated delays that are less than the constraint value.

For example, client device 210 may determine a constrained node associated with a constraint value (e.g., 2 units). Client device 210 may determine a first retiming value associated with a first node by determining that a first accumulated delay (e.g., 3 units) of the first node is greater than the constraint value (e.g., 2 units). In this instance, client device 210 may set the first retiming value to 1. Client device 210 may determine a second retiming value associated with a second node by determining that a second accumulated delay (e.g., 1 unit) of the second node is less than the constraint value (e.g., 2 units). In this instance, client device 210 may set the second retiming value to 0. In some implementations, client device 210 may determine a set of nodes associated with a first retiming value (e.g., 1) and a set of nodes associated with a second retiming value (e.g., 0).

As further shown in FIG. 4B, process 400 may include modifying the latency graph based on the constraint information (block 445). For example, client device 210 may modify the latency graph by retiming the latency graph based on the constraint information (e.g., by redistributing one or more weights associated with the latency graph).

In some implementations, client device 210 may redistribute the weights by incrementing the weights of edges directed into a node, and/or by decrementing weights of edges directed out of the node. For example, the retimed weight of an edge, $w_r(e)$, between a first node (e.g., $n_1$) and a second node (e.g., $n_2$) may be given by the following relationship:

$$w_r(e)=w(e)+r(n_2)-r(n_1),$$

where $w(e)$ is the weight of the edge from the first node to the second node, $r(n_1)$ is the retiming value associated with the first node, and $r(n_2)$ is the retiming value associated with the second node. For example, an edge associated with a weight of 3 units (e.g., w(e)) may start from a first node (e.g., $n_1$) associated with a first retiming value of 0 (e.g., $r(n_1)$) and end at a second node (e.g., $n_2$) associated with a second retiming value of 1 unit (e.g., $r(n_2)$). Client device 210 may determine the retimed weight of the edge (e.g., $w_r(e)$) by taking the weight of the edge (e.g., 3 units), adding the retiming value of the second node (e.g., 1 unit) and subtracting the retiming value of the first node (e.g., 0 units). In this manner, client device may determine the retimed weight of the edge (e.g., 3+1−0=4). Thus, client device 210 may increment the weight of the edge by 1 unit.

In some implementations, client device 210 may determine a region of interest. The region of interest may include a region that includes those nodes associated with a retiming value of 1. Client device 210 may modify the latency graph by incrementing weights of edges directed into the region of interest (e.g., increasing the weights by 1 unit), and/or by decrementing weights of edges directed out of the region of interest (e.g., decreasing the weights by 1 unit). In some implementations, the region of interest may include edges (e.g., paths) between nodes inside the region of interest, and client device 210 may ignore a weight associated with an edge inside the region of interest when incrementing and/or decrementing weights associated with the latency graph.

As further shown in FIG. 4B, process 400 may include determining whether there are to be further iterations (block 450). For example, client device 210 may determine that there is to be additional delay rearranged in the model (e.g., to satisfy a request for delay by a user). Additionally, or alternatively, client device 210 may determine that there are to be no further iterations.

In some implementations, client device 210 may determine that there are to be further iterations based on determining that there are additional edges for which delay is to be associated (e.g., additional nodes to be constrained). Additionally, or alternatively, client device 210 may determine that there are to be additional iterations based on determining that there are additional quantities of delay to be added to an edge (e.g., an edge associated with a constrained node).

In some implementations, client device 210 may determine that there are to be no further iterations. For example, client device 210 may determine that the modified latency graph satisfies the delay information (e.g., that the delay has been redistributed according to preferences identified by the delay information). Thus, additional iterations may be unnecessary. Additionally, or alternatively, client device 210 may determine that a request for delay cannot be satisfied (e.g., that further iterations would not satisfy a constraint, that there are no more weights in the latency graph to be redistributed, etc.).

In some implementations, based on determining that there are to be no further iterations, client device 210 may increment a weight of an edge associated with a satisfied node. For example, client device 210 may add the weight of a satisfied node that had been removed when determining the set of satisfied nodes (e.g., that had been removed in block 430).

If there are to be further iterations (block 450—YES), then process 400 may include returning to block 425 and determining the set of satisfied nodes based on the modified latency graph.

As further shown in FIG. 4B, if there are to be no further iterations (block 450—NO), then process 400 may include modifying the model based on the modified latency graph (block 455). For example, client device 210 may modify the model so that one or more delay elements of the model correspond to one or more weights associated with the modified latency graph. In some implementations, client device 210 may add and/or remove a delay element from the model, may increase and/or decrease an amount of delay associated with a delay element (e.g., to correspond to a weight of the modified latency graph), may change a location of a delay element (e.g., to correspond to a location of the weight of the modified latency graph), or the like.

As further shown in FIG. 4B, process 400 may include providing the modified model (block 460). For example, client device 210 may provide the modified model by displaying the modified model to a user (e.g., a user of client device 210). In some implementations, client device 210 may visually distinguish features of the modified model that differ from a previous version of the model (e.g., may visually emphasize how the model has been modified). Additionally, or alternatively, client device 210 may display the previous version of the model, and may permit the user to revert back to the previous version of the model.

In some implementations, client device 210 may provide code associated with the model and/or the modified latency graph. In some implementations, the code may include a source code representation, a hardware description language ("HDL"), or the like. In some implementations, client device 210 may generate the code by use of a compiler and/or linker, and may provide the code to another device (e.g., server device 220).

As further shown in FIG. 4B, process 400 may include generating a report based on the modified model (block 465). For example, client device 210 may generate the report, and may provide the report to a user of client device 210 (e.g., via a user interface).

In some implementations, the report may include information that identifies whether the modified model satisfies one or more constraints (e.g., constraints selected by a user of client device 230). For example, the report may identify a set of constraints selected by the user, and may identify that the constraints are satisfied by the modified model. Additionally, or alternatively, the report may identify a constraint that is not satisfied by the modified model. In some implementations, the report may identify a deficit associated with an unsatisfied delay (e.g., an amount of delay by which the modified latency graph is less than the constraint). In some implementations, a status indicating whether or not the constraint is satisfied may be displayed directly on the model. For example, client device 210 may display information that identifies whether a constraint associated with a particular node has been satisfied.

Although FIGS. 4A-4B show example blocks of process 400, in some implementations, process 400 may include additional blocks, fewer blocks, different blocks, and/or differently arranged blocks than those depicted in FIGS. 4A-4B. Additionally, or alternatively, two or more of the blocks of process 400 may be performed in parallel.

FIGS. 5A-5F are diagrams of an example implementation 500 relating to process 400 (FIGS. 4A-4B). In example implementation 500, client device 210 may redistribute delay associated with a model based on delay information.

Figure 5A:
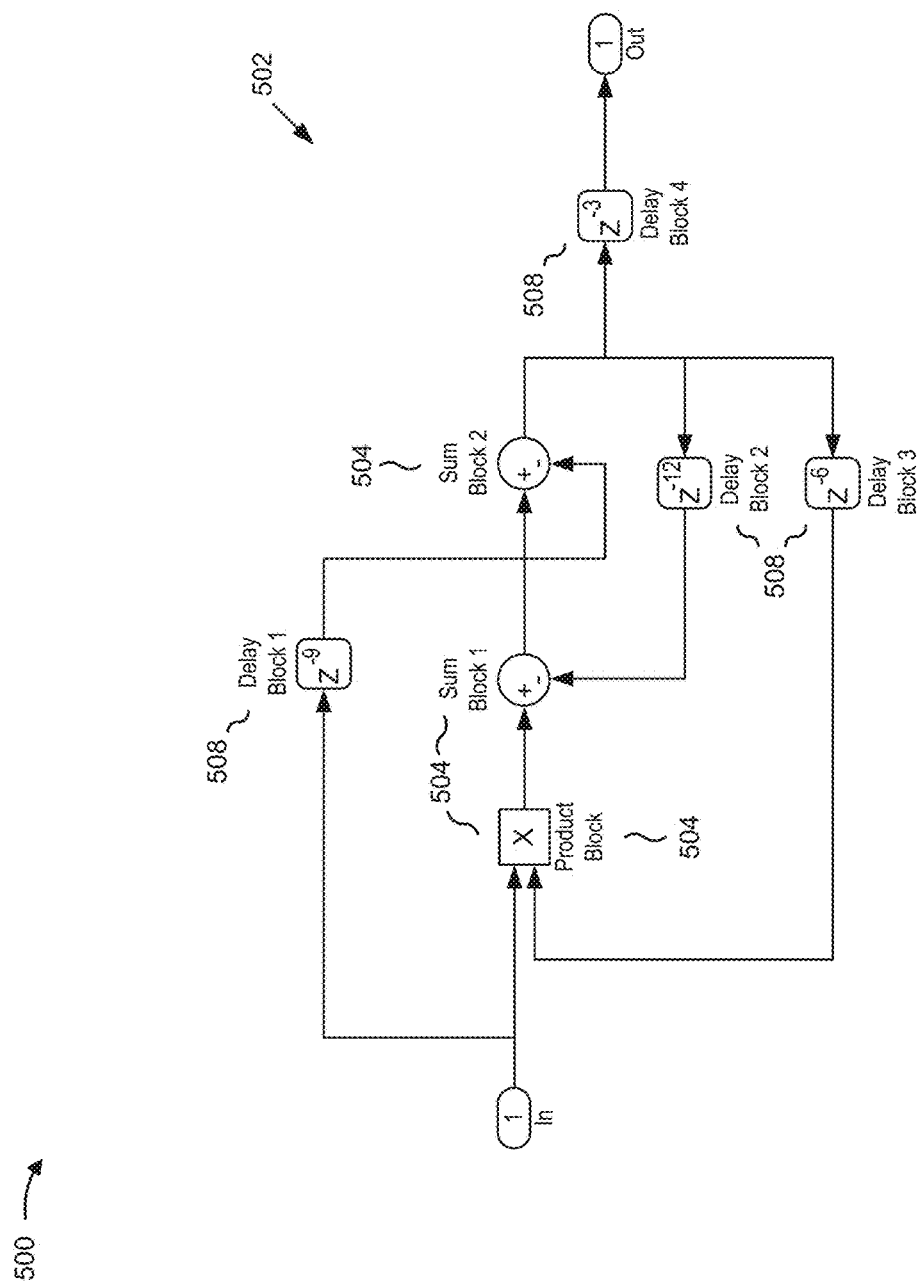
FIGS. 5A-5F are diagrams of an example implementation relating to the example process shown in FIG. 4.

As shown in FIG. 5A, and by reference number 502, client device 210 may obtain a model. As shown by reference number 504, the model may include a set of model elements, including a product block, a first sum block (e.g., "Sum Block 1") and a second sum block (e.g., "Sum Block 2"). Client device 210 may receive delay information that indicates that the product block, the first sum block, and the second sum block are each to be associated with 1 cycle of delay. As shown by reference number 508, the model may include a set of delay elements, including a first delay block (e.g., "Delay Block 1") associated with 9 cycles of delay between an input and the second sum block, a second delay block (e.g., "Delay Block 2") associated with 12 cycles of delay between the second sum block and the first sum block, a third delay block (e.g., "Delay Block 3") associated with 6 cycles of delay between the second sum block and the product block, and a fourth delay block (e.g., "Delay Block 4") associated with 3 cycles of delay between the second sum block and an output.

Figure 5B:
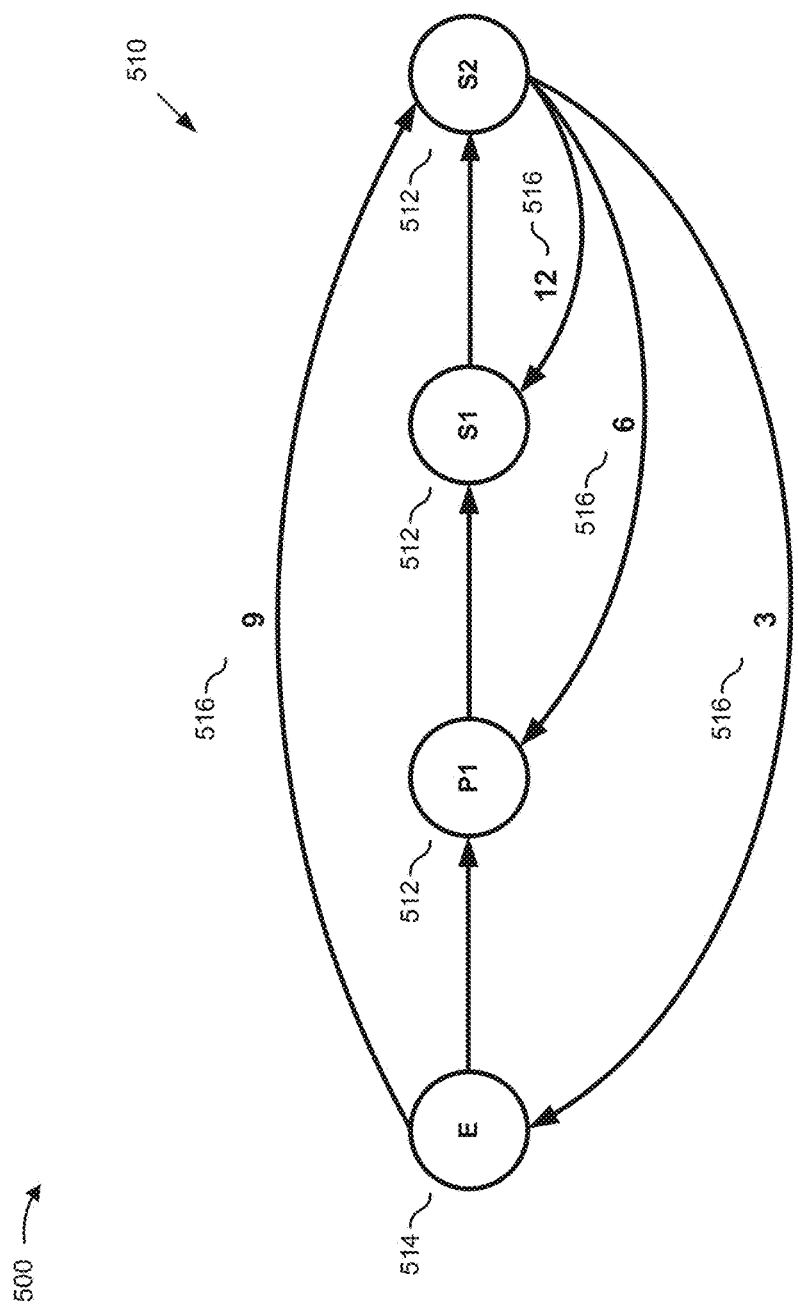

As shown in FIG. 5B, and by reference number 510, client device 210 may determine a latency graph associated with the model. As shown by reference number 512, the latency graph may include a set of nodes corresponding to the model elements of the model, including a product node representing the product block (e.g., "P1"), a first sum node representing the first sum block (e.g., "S1"), and a second sum node representing the second sum block (e.g., "S2"). As shown by reference number 514, the set of nodes may include an external node (e.g., "E") representing an input and/or output of the model. Client device 210 may set a uniform quantity of delay for each node of the set of nodes (e.g., 1 cycle).

As shown by reference number 516, the latency graph may include a set of weights corresponding to units of delay associated with the model, including a first weight between the external node E and second sum node S2 (e.g., 9 units), a second weight between second sum node S2 and the first sum node S1 (e.g., 12 units), a third weight between second sum node S2 and product node P1 (e.g., 6 units), and a fourth weight between second sum node S2 and external node E (e.g., 3 units). Client device 210 may determine that there is not a weight of 1 unit on the edge directed out of product node P1, and that there is not a weight of 1 unit on the edge directed out of first sum node S1. Additionally, client device 210 may determine that the weights of the edges directed out of second sum node S2 (e.g., 12 units, 6 units, and 3 units) do not exactly satisfy the 1 unit of delay identified in the delay information (e.g., the constraint associated with the second sum block). Thus, client device 210 may determine that none of the nodes are satisfied nodes.

Figure 5C:
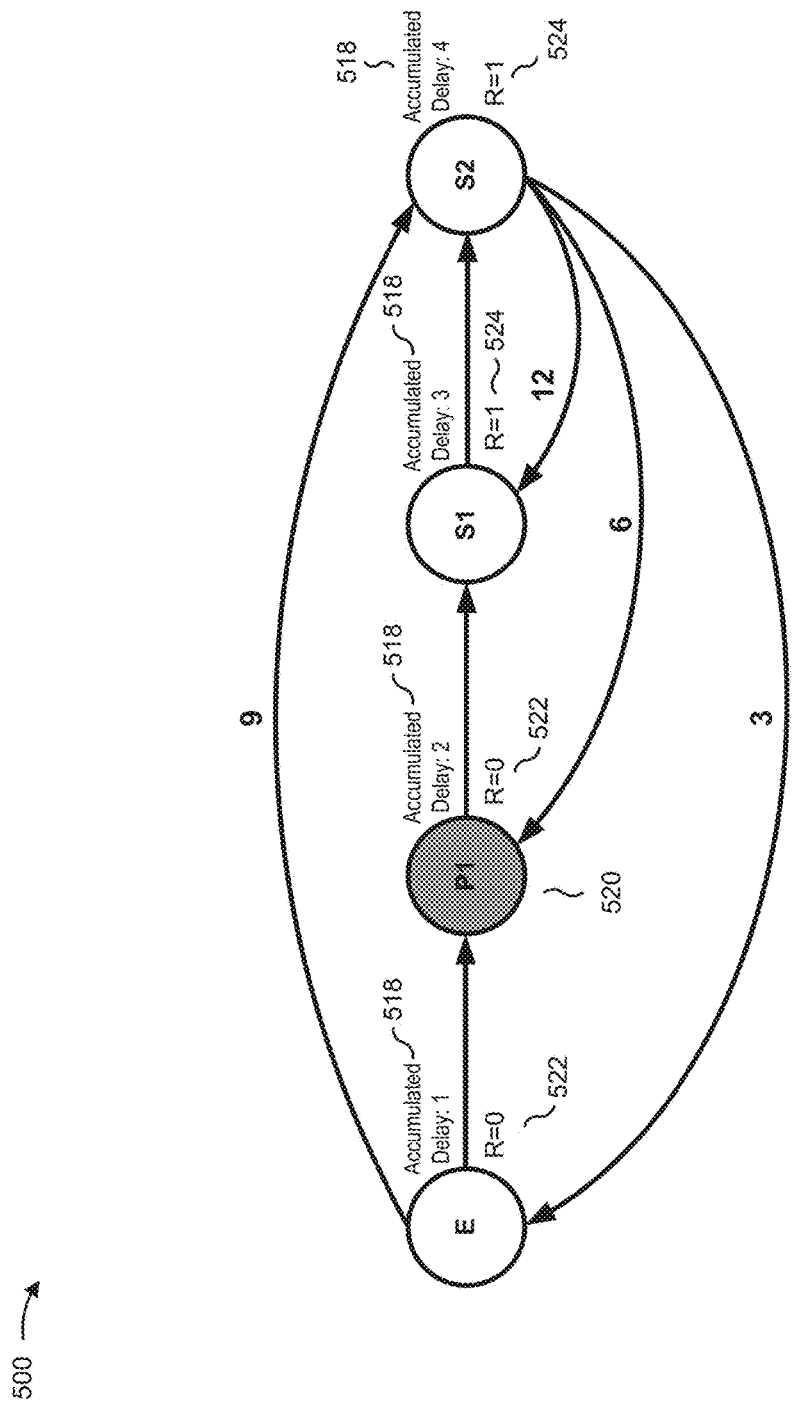

As shown in FIG. 5C, and by reference number 518, client device 210 may determine accumulated delay information associated with the set of nodes. The accumulated delay information may include information that identifies a quantity of delay on a path between two weights (e.g., corresponding to two delay elements in the model). The path may start after the edge associated with the fourth weight (e.g., 3 cycles), may include external node E, product node P1, first sum node S1, and second sum node S2, and may terminate at the second weight (e.g., 12 cycles). Client device 210 may determine that external node E has an accumulated delay of 1 cycle (e.g., as external node E is the first node along the path). Client device 210 may determine that product node P1 has an accumulated delay of 2 cycles (e.g., the delay associated with external node E plus the delay associated with product node P1). Client device 210 may determine that first sum node S1 has an accumulated delay of 3 cycles (e.g., the delay associated with external node E plus the delay associated with product node P1 plus the delay associated with first sum node S1). Client device 210 may determine that second sum node S2 has an accumulated delay of 4 cycles (e.g., the delay associated with external node E plus the delay associated with product node P1 plus the delay associated with first sum node S1 plus the delay associated with second sum node S2).

As shown by reference number 520, client device 210 may determine a constrained node (e.g., "P1"), and may determine a constraint value (e.g., 2 cycles) based on the accumulated delay associated with the constrained node (e.g., 2 cycles). As shown by reference number 522, based on determining that the accumulated delay associated with external node E (e.g., 1 cycle) is less than the constraint value (e.g., 2 cycles), client device 210 may determine that external node E is to be associated with a retiming value of 0. Based on determining that the accumulated delay associated with product node P1 (e.g., 2 cycles) is equal to the constraint value (e.g., 2 cycles), client device 210 may determine that product node P1 is to be associated with a retiming value of 0. As shown by reference number 524, based on determining that the accumulated delay associated with first sum node S1 (e.g., 3 cycles) is greater than the constraint value (e.g., 2 cycles), and based on determining that the accumulated delay associated with second sum node S2 (e.g., 4 cycles) is greater than the constraint value (e.g., 2 cycles), client device 210 may determine that first sum node S1 and second sum node S2 are to be associated with a retiming value of 1.

Figure 5D:
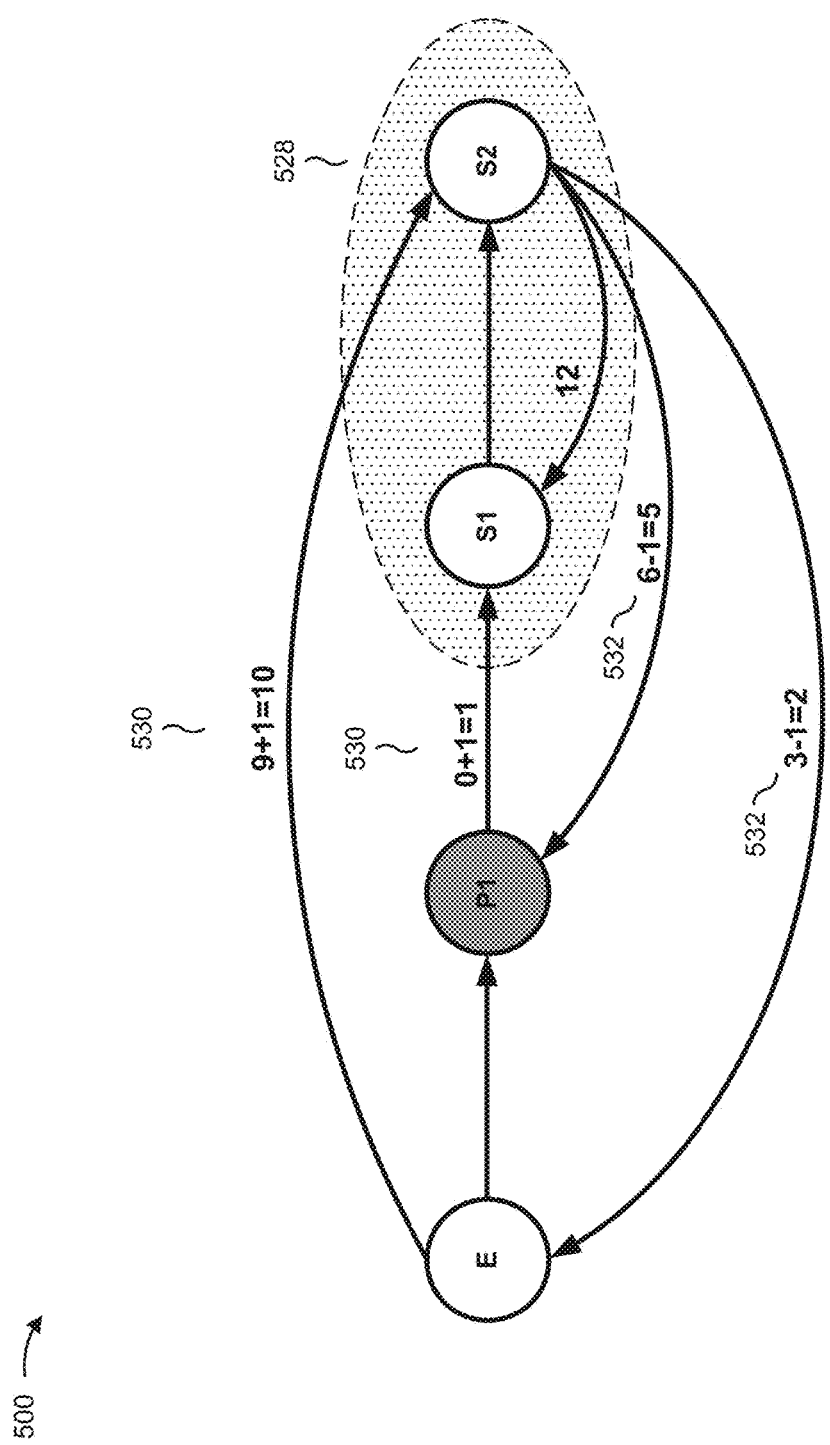

As shown in FIG. 5D, and by reference number 528, client device 210 may determine a region of interest. Region of interest 528 may include a region corresponding to nodes associated with a retiming value of 1. In example implementation 500, region of interest 528 includes first sum node S1 and second sum node S2. Region of interest 528 may also include an edge between second sum node S2 and first sum node S1 (e.g., the edge associated with a weight of 12).

As shown by reference number 530, client device 210 may increment weights associated with edges directed into region of interest 528. Thus, the weight (e.g., 9 cycles) associated with the edge from external node E into region of interest 528 may be increased by 1 cycle (e.g., to a total of 10 cycles), and the weight (e.g., 0 cycles) associated with the edge from product node P1 into region of interest 528 may be increased by 1 cycle (e.g., to a total of 1 cycle). As shown by reference number 532, client device 210 may decrement weights associated with edges directed out of region of interest 528. Thus, the weight (e.g., 6 cycles) associated with the edge from region of interest 528 to product node P1 may be decreased by 1 cycle (e.g., to a total of 5 cycles), and the weight (e.g., 3 cycles) associated with the edge from region of interest 528 to external node E may be decreased by 1 cycle (e.g., to a total of 2 cycles). In this manner, client device 210 may redistribute the delay associated with the latency graph so that 1 cycle exists between product node P1 and first sum node S1 (e.g., to satisfy the constraint of having 1 unit of delay following the product node P1).

Figure 5E:
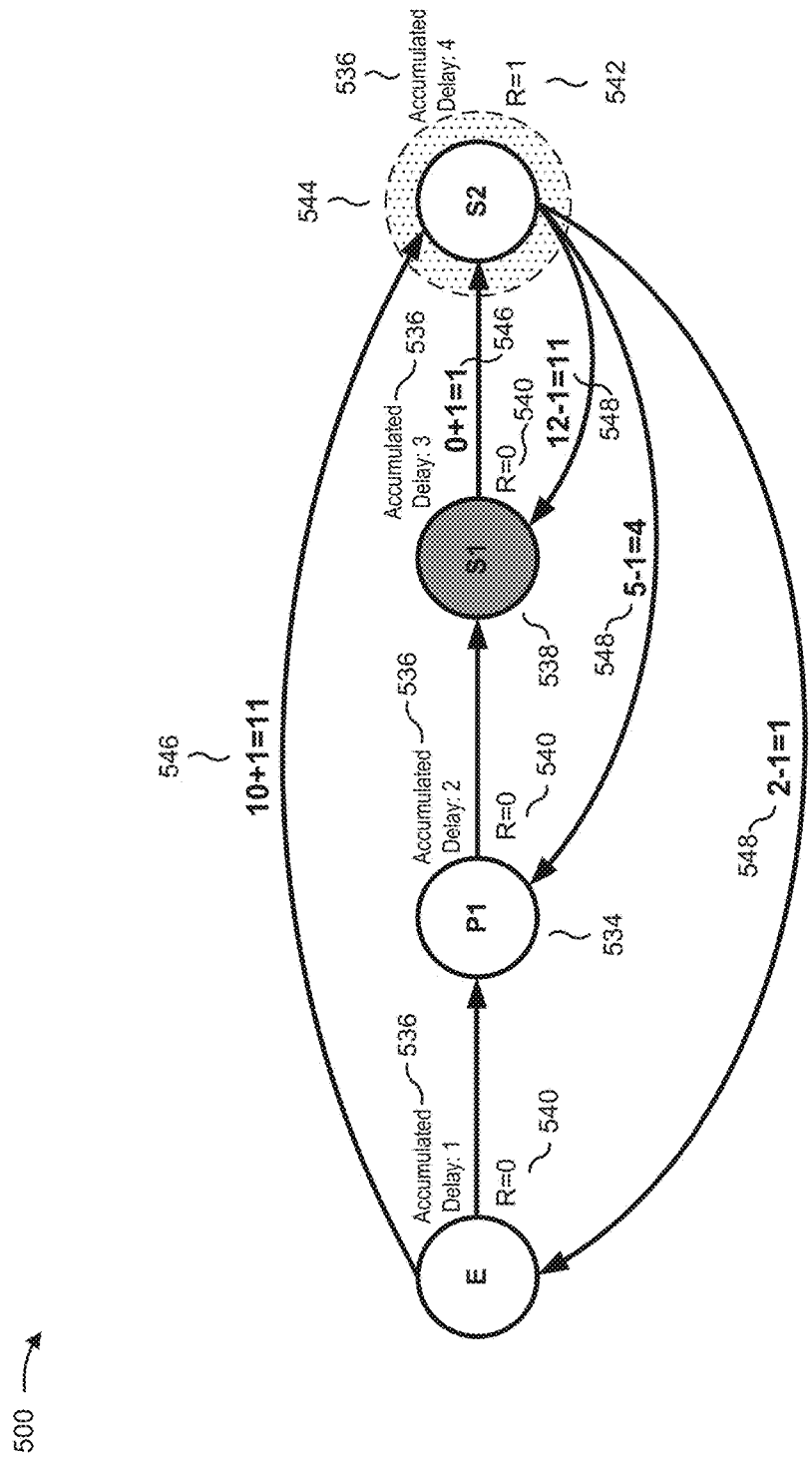

As shown in FIG. 5E, and by reference number 534, client device 210 may determine that product node P1 is a satisfied node (e.g., that product node P1 is now associated with 1 cycle of delay as requested in the delay information). Client device 210 may remove the delay associated with the satisfied node (e.g., 1 cycle) to permit client device 210 to redistribute delay without affecting the delay at the output of the satisfied node. As shown by reference number 536, client device 210 may determine that external node E is associated with an accumulated delay of 1 cycle, that product node P1 is associated with an accumulated delay of 2 cycles, that first sum node S1 is associated with an accumulated delay of 3 cycles, and that second sum node S2 is associated with an accumulated delay of 4 cycles.

As shown by reference number 538, client device 210 may determine that first sum node S1 is a constrained node. Based on the accumulated delay associated with the first sum node S1 (e.g., 3 cycles), client device 210 may determine that the constraint value (e.g., a new constraint value associated with the current constrained node) is 3 cycles. As shown by reference number 540, client device 210 may determine that external node E, product node P1, and first sum node S1 are to be associated with a retiming value of 0 (e.g., based on determining that the accumulated delay associated with external node E, the accumulated delay associated with product node P1, and the accumulated delay associated with first sum node S1 are less than or equal to the constraint value). As shown by reference number 542, client device 210 may determine that second sum node S2 is to be associated with a retiming value of 1 (e.g., based on determining that the accumulated delay associated with the second sum node is greater than the constraint value). As shown by reference number 544, client device 210 may determine a region of interest that includes second sum node S2 (e.g., based on determining that second sum node S2 is associated with a retiming value of 1).

Client device 210 may increment the weights associated with edges directed into region of interest 544. As shown by reference number 546, the edge from external node E to region of interest 544 may be increased by 1 cycle (e.g., to a total of 11 cycles), and the edge from first sum node S to region of interest 544 may be increased by 1 cycle (e.g., to a total of 1 cycle). As shown by reference number 548, client device 210 may decrement the weights associated with edges directed out of region of interest 544. Thus the edge from region of interest 544 to first sum node S1 may be decreased by 1 cycle (e.g., to a total of 11 cycles), the edge from region of interest 544 to product node P1 may be decreased by 1 cycle (e.g., to a total of 4 cycles), and the edge from region of interest 544 to external node E may be decreased by 1 cycle (e.g., to a total of 1 cycle). In this manner, client device 210 may redistribute the delay associated with the latency graph so that 1 cycle exists between first sum node S1 and second sum node S2 (e.g., to satisfy the constraint for the first sum node).

Client device 210 may determine that second sum node S2 is associated with at least 1 cycle of delay. Based on determining that second sum node S2 is associated with 1 cycle of delay, client device 210 may determine that there are to be no further iterations (e.g., based on determining that a constraint identified in the delay information is satisfied). Client device 210 may increment the delay associated with the satisfied node (e.g., may add the 1 cycle of delay following product node P1 that was removed earlier).

Figure 5F:
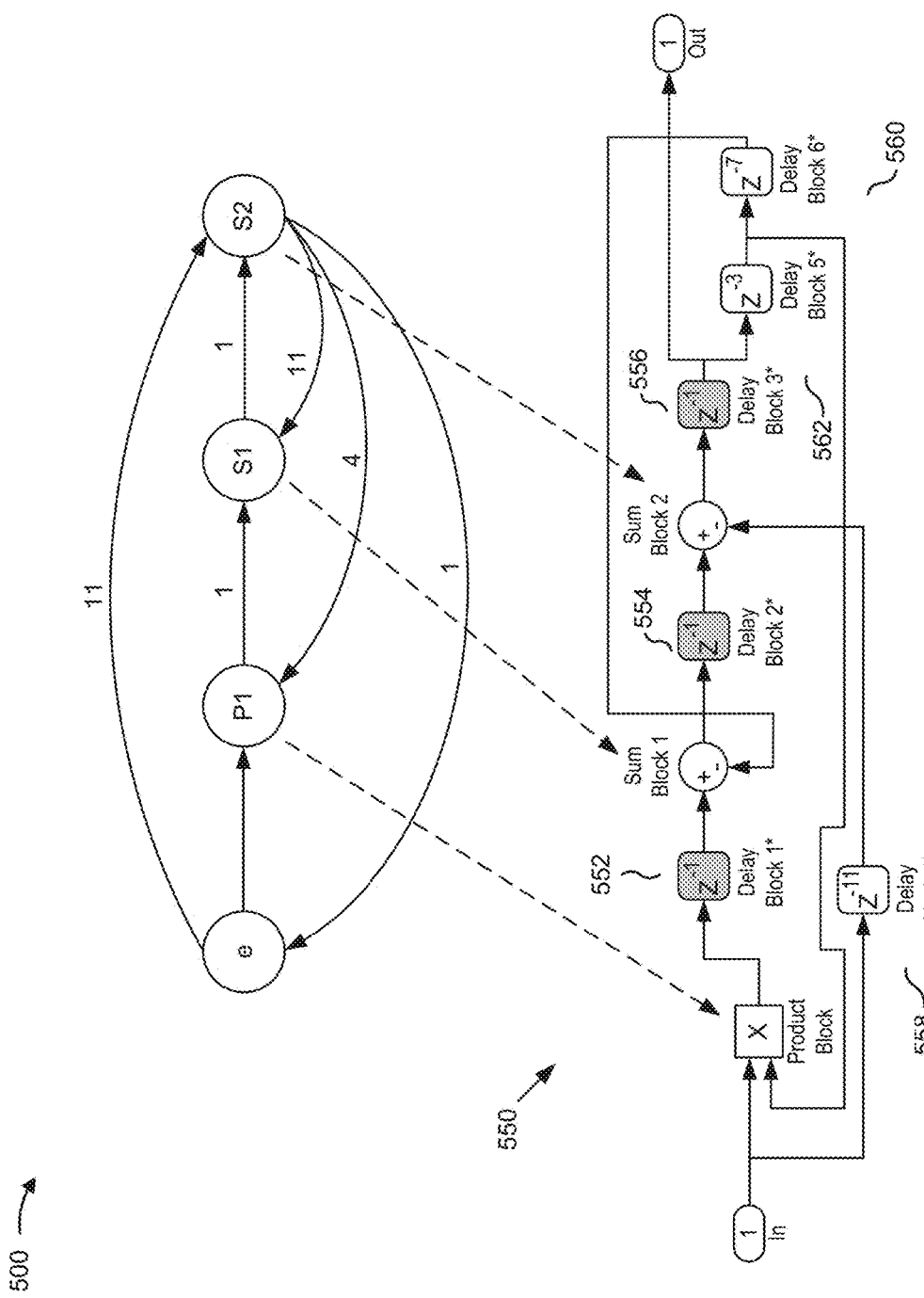

As shown in FIG. 5F, and by reference number 550, client device 210 may modify the model based on the modified latency graph (e.g., the re-timed latency graph). As shown by reference number 552, to correspond to the 1 unit of weight following product node P1, client device 210 may add a delay block (e.g., "Delay Block 1*") of 1 cycle following the product block. As shown by reference number 554, to correspond to the 1 unit of weight following first sum node S1, client device 210 may add a delay block (e.g., "Delay Block 2*") of 1 cycle following the first sum block (e.g., "Sum Block 1"). As shown by reference number 556, to correspond to the 1 unit of weight following second sum node S2, client device 210 may add a delay block (e.g., "Delay Block 3*") of 1 cycle following the second sum block (e.g., "Sum Block 2").

As shown by reference number 558, client device 210 may modify former delay block 1 (FIG. 5A) to have 11 cycles of delay corresponding to the 11 units of weight following external node E. As shown by reference number 560, to correspond to the 11 units of weight between second sum node S2 and first sum node S1, client device 210 may configure the model to have 11 cycles of delay from the second sum block to the first sum block (e.g., including 1 cycle associated with "Delay Block 3*," 3 cycles associated with "Delay Block 5*," and 7 cycles associated with "Delay Block 6*"). As shown by reference number 562, to correspond to the 4 units of weight from second sum node S2 to product node P1, client device 210 may configure the model to have 4 cycles of delay from the second sum block to the product block (e.g., including 1 cycle associated with "Delay Block 3*," and 3 cycles associated with "Delay Block 5*"). Thus, client device 210 may modify the model to correspond to the modified latency graph. The modified model may be associated with a critical path that is shorter than a critical path associated with the model (e.g., as shown in FIG. 5A). Based on decreasing the critical path associated with the model, client device 210 may operate the model at an increased rate (e.g., a rate that is greater than a rate associated with the un-modified model). Based on operating the model at the increased rate, client device 210 may increase throughput associated with the model.

As indicated above, FIGS. 5A-5F are provided merely as an example. Other examples are possible and may differ from what was described with regard to FIGS. 5A-5F.

Figure 6:
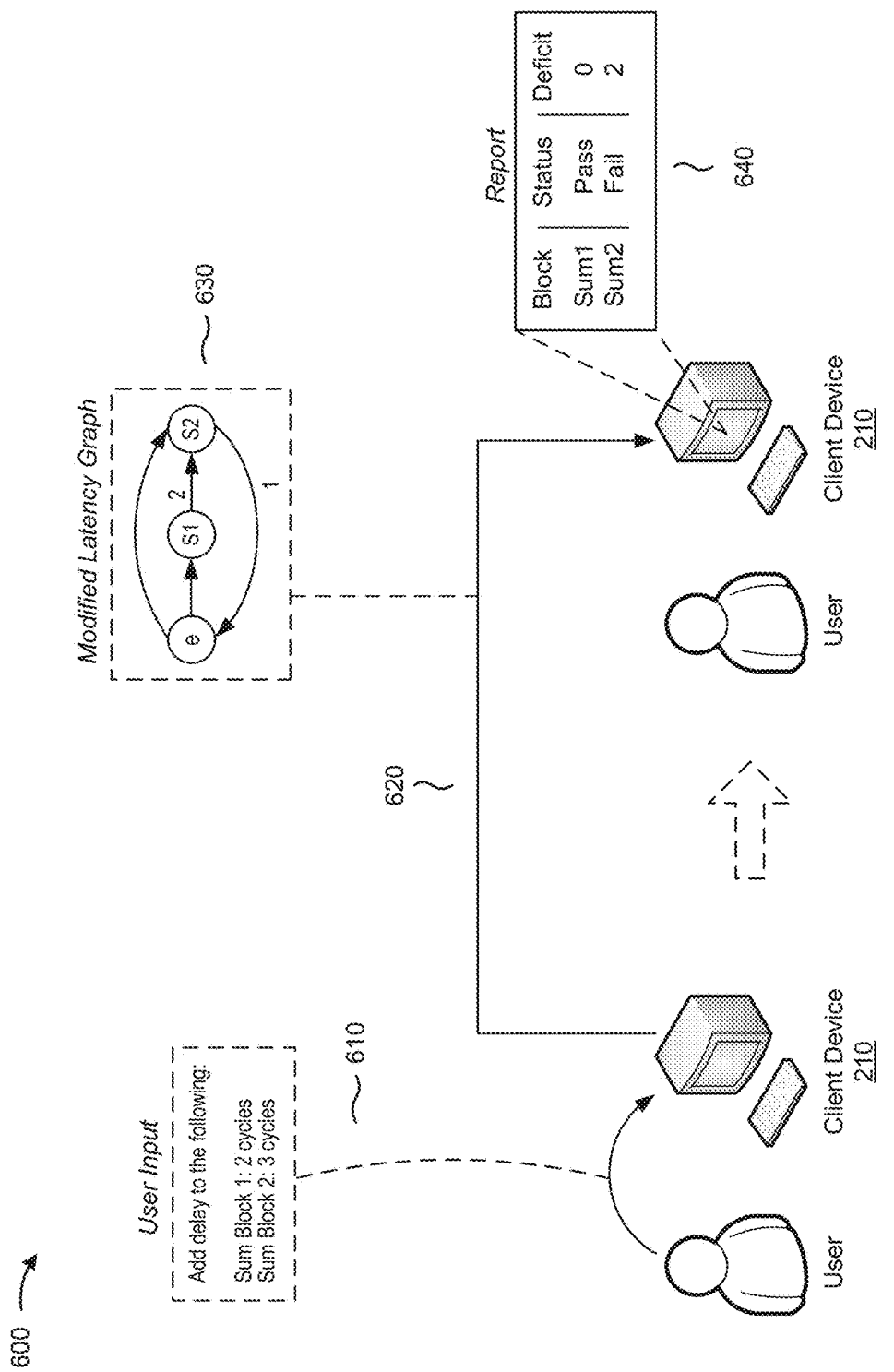
FIG. 6 is a diagram of another example implementation relating to the example process shown in FIG. 4.

FIG. 6 is a diagram of another example implementation 600 relating to process 400 (FIGS. 4A-4B). In example implementation 600, a user of client device 210 may specify a set of constraints to be applied to a model. After redistributing delays associated with the model, client device 210 may provide a report to the user.

As shown by reference number 610, the user may provide delay information to client device 210 (e.g., via a user interface). The delay information may be associated with a model including a first sum block and a second sum block. The delay information may include a first constraint (e.g., that 2 cycles of delay are to follow the first sum block) and a second constraint (e.g., that 3 cycles of delay are to follow the second sum block).

As shown by reference number 620, client device 210 may redistribute delay associated with the model to attempt to satisfy the set of constraints (e.g., may determine a latency graph based on the model and the delay information, may determine a set of satisfied nodes, of a set of nodes, associated with the latency graph, may determine accumulated delay information associated with the set of nodes, and may determine constraint information based on the accumulated delay information).

As shown by reference number 630, client device 210 may determine a modified latency graph based on redistributing delay associated with the model (e.g., based on the constraint information). The modified latency graph may include an external node, a first sum node, and a second sum node. Latency graph may include a weight associated with the first sum node (e.g., 2 cycles) and a weight associated with the second node (e.g., 1 cycle). Client device 210 may determine that the first sum node satisfies the first constraint (e.g., that the first sum node is followed by a weight of 2 cycles) and that the second sum node does not satisfy second constraint (e.g., that the second sum node is followed by a delay of 1 cycle instead of a delay of 3 cycles). Based on determining that there is no more delay to distribute among the set of nodes, client device 210 may end (e.g., may determine that there are to be no further iterations).

As shown by reference number 640, client device 210 may generate a report, and may display the report on the user interface. The report may indicate that the first constraint associated with the first sum block has been satisfied (e.g., "Pass"), and may indicate that the second constraint associated with the second sum block has not been satisfied (e.g., "Fail"). Additionally, the report may indicate a deficit associated with the unsatisfied second constraint (e.g., that there is a deficit of 2 cycles).

As indicated above, FIG. 6 is provided merely as an example. Other examples are possible and may differ from what was described with regard to FIG. 6.

Implementations described herein may allow a client device to satisfy a user-constrained delay requirement by extracting the delay from other portions of the model (e.g., by redistributing delay associated with the model to satisfy a constraint provided by the user).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   determine that a model is associated with an optimization,
      the model including a plurality of model elements and a plurality of delay elements,
      the optimization including:
         modifying throughput associated with the model,
         modifying a critical path associated with the model, and
         pipelining the model;
      the model being associated with a total quantity of delay;
   receive delay information that identifies a model element, of the plurality of model elements, and a constraint quantity of delay associated with the model element;
   determine a quantity of accumulated delay associated with the model element based on the model;
   determine one or more retiming values associated with the plurality of model elements based on comparing the quantity of accumulated delay associated with the model element to the constraint quantity of delay associated with the model element;
   redistribute, via distributed pipelining and based on the optimization, quantities of delay among the plurality of delay elements associated with the model to obtain a redistributed model, based on the one or more retiming values, to satisfy the constraint quantity of delay associated with the model element, and to maintain the total quantity of delay associated with the model,
      where the quantities of delay are redistributed to shorten the critical path between two of the plurality of delay elements without adding additional latency,
         where latency is a time delay between an input of the model and output of the model generated based on the input; and
   provide the redistributed model.

2. The device of claim 1, where the one or more processors, when receiving the delay information, are further to:
   receive user input that identifies a constraint,
      the constraint identifying the constraint quantity of delay associated with the model element and a location in the model that the constraint quantity of delay associated with the model element is to be inserted; and
   where the one or more processors, when redistributing the quantities of delay among the plurality of delay elements, are further to:
   redistribute the quantities of delay to satisfy the constraint.

3. The device of claim 1, where the model is a time-based block diagram model.

4. The device of claim 1, where the model element is associated with a sample time, and the constraint quantity of delay associated with the model element is associated with a quantity of clock cycles associated with the sample time; and
   where the one or more processors, when redistributing the quantities of delay among the plurality of delay elements, are further to:
   redistribute the quantities of delay to satisfy the quantity of clock cycles.

5. The device of claim 1, where the one or more processors, when receiving the delay information associated with the model, are further to:
   provide a visual representation of the constraint quantity of delay associated with the model element associated with the model element for display to a user; and where the one or more processors, when providing the redistributed model, are further to:
provide the redistributed model for display to the user.

6. The device of claim 1, where the one or more processors, when determining the quantity of accumulated delay, are further to:
identify a first edge associated with a first delay element, and a second edge associated with a second delay element;
determine one or more model elements on a path between the first delay element and the second delay element; and
determine the quantity of accumulated delay based on the one or more model elements.

7. A non-transitory computer-readable medium storing instructions, the instructions comprising:
one or more instructions that, when executed by one or more processors, cause the one or more processors to:
determine that a model is associated with an optimization,
the model including a plurality of model elements and a plurality of delay elements,
the optimization including:
modifying throughput associated with the model,
modifying a critical path associated with the model, and
pipelining the model:
the model being associated with a total quantity of delay;
receive delay information that identifies a model element, of the plurality of model elements, and a constraint value associated with the model element;
determine a quantity of accumulated delay based on the model;
determine one or more retiming values associated with the plurality of model elements based on comparing the quantity of accumulated delay associated with the model element to the constraint value associated with the model element;
redistribute, via distributed pipelining and based on the optimization, quantities of delay among the plurality of delay elements associated with the model to obtain a redistributed model, based on the one or more retiming values, to satisfy the constraint value associated with the model element, and to maintain the total quantity of delay associated with the model, where the quantities of delay are redistributed to shorten the critical path between two of the plurality of delay elements without adding additional latency,
where latency is a time delay between an input of the model and output of the model generated based on the input; and
provide the redistributed model.

8. The non-transitory computer-readable medium of claim 7, where the instructions further comprise:
one or more instructions that cause the one or more processors to:
determine a latency graph based on the model,
the latency graph including a plurality of nodes corresponding to the plurality of model elements and one or more weights corresponding to the plurality of delay elements;
where the one or more instructions, that cause the one or more processors to determine the quantity of accumulated delay, further cause the one or more processors to:
determine the quantity of accumulated delay based on the latency graph;
where the one or more instructions, that cause the one or more processors to determine the one or more retiming values, further cause the one or more processors to:
determine the one or more retiming values based on the latency graph;
where the one or more instructions, that cause the one or more processors to redistribute quantities of delay among the plurality of delay elements, further cause the one or more processors to:
redistribute the one or more weights based on the one or more retiming values; and
where the one or more instructions, that cause the one or more processors to provide the redistributed model, further cause the one or more processors to:
generate a modified model based on redistributing the one or more weights; and
provide the modified model.

9. The non-transitory computer-readable medium of claim 8, where the instructions further comprise:
one or more instructions that cause the one or more processors to:
determine a satisfied node,
the satisfied node including a node, of the plurality of nodes, that satisfies the constraint value; and
where the one or more instructions, that cause the one or more processors to redistribute the one or more weights, further cause the one or more processors to:
redistribute the one or more weights based on the satisfied node.

10. The non-transitory computer-readable medium of claim 7, where the instructions further comprise:
one or more instructions that cause the one or more processors to:
determine that the constraint value associated with the model element is not satisfied;
redetermine the quantity of accumulated delay based on determining that the constraint value associated with the model element is not satisfied;
redetermine the one or more retiming values based on redetermining the quantity of accumulated delay; and
redistribute the quantities of delay among the plurality of delay elements based on redetermining the one or more retiming values.

11. The non-transitory computer-readable medium of claim 7, where the one or more instructions, that cause the one or more processors to determine the one or more retiming values, further cause the one or more processors to:
determine a region of interest associated with one or more model elements, of the plurality of model elements, associated with a retiming value of the one or more retiming values; and
where the one or more instructions, that cause the one or more processors to redistribute the quantities of delay among the plurality of delay elements, further cause the one or more processors to:
redistribute the quantities of delay based on the region of interest.

12. The non-transitory computer-readable medium of claim 7, where the one or more instructions, that cause the one or more processors to determine the one or more retiming values, further cause the one or more processors to:

determine a particular model element, of the plurality of model elements, associated with a retiming value of the one or more retiming values; and where the one or more instructions, that cause the one or more processors to redistribute the quantities of delay among the plurality of delay elements, further cause the one or more processors to:

increment a particular quantity of delay associated with an edge directed to the particular model element.

13. The non-transitory computer-readable medium of claim 7, where the one or more instructions, that cause the one or more processors to determine the one or more retiming values, further cause the one or more processors to:

determine a particular model element, of the plurality of model elements, associated with a retiming value of the one or more retiming values; and where the one or more instructions, that cause the one or more processors to redistribute the quantities of delay among the plurality of delay elements, further cause the one or more processors to:

decrement a particular quantity of delay associated with an edge directed from the particular model element.

14. The non-transitory computer-readable medium of claim 7, where the one or more instructions, that cause the one or more processors to determine the one or more retiming values, further cause the one or more processors to:

determine a first retiming value for the model element if the quantity of accumulated delay associated with the model element is greater than the constraint value associated with the model element; and determine a second retiming value for the model element if the quantity of accumulated delay associated with the model element is not greater than the constraint value associated with the model element, the first retiming value being different than the second retiming value.

15. A method, comprising:

determining that a model is associated with an optimization, the model including a plurality of model elements and a plurality of delay elements, the optimization including:
modifying throughput associated with the model,
modifying a critical path associated with the model, and
pipelining the model;

the model being associated with a total quantity of delay, the determining that the model is associated with the optimization being performed by a device;

receiving delay information that identifies a model element, of the plurality of model elements, and a constraint value associated with the model element, the receiving the delay information being performed by the device;

determining a quantity of accumulated delay associated with the model element based on the model, the determining the quantity of accumulated delay being performed by the device;

determining one or more retiming values associated with the plurality of model elements based on comparing the quantity of accumulated delay associated with the model element to the constraint value applied to the model element, the determining the plurality of retiming values being performed by the device;

redistributing, via distributed pipelining and based on the optimization, the plurality of delay elements associated with the model to obtain a redistributed model, based on the one or more retiming values, to satisfy the constraint value applied to the model element, and to maintain the total quantity of delay associated with the model, where the plurality of delay elements are redistributed to shorten the critical path between two of the plurality of delay elements without adding additional latency, where latency is a time delay between an input of the model and output of the model generated based on the input, the redistributing the plurality of delay elements being performed by the device; and providing the redistributed model, the providing the redistributed model being performed by the device.

16. The method of claim 15, where redistributing the plurality of delay elements further comprises:

determining that the constraint value is satisfied; and where providing the redistributed model further comprises:

generating a report indicating that the constraint value is satisfied; and providing the report.

17. The method of claim 15, where redistributing the plurality of delay elements further comprises:

determining that the constraint value is not satisfied; and where providing the redistributed model further comprises:

generating a report indicating that the constraint value is not satisfied; and providing the report.

18. The method of claim 17, where the constraint value is a quantity of delay associated with the model element;

where determining that the constraint value is not satisfied further comprises:

determining a deficit; and where generating the report further comprises:

generating the report to include information that identifies the deficit.

19. The method of claim 15, where determining the delay information further comprises:

receiving user input including at least one of:
a script associated with the model;
a formula associated with the model; or
an equation associated with the model; and determining the delay information based on at least one of:
the script;
the formula; or
the equation.

* * * * *